US006009924A

United States Patent [19]

Peleman

[11] Patent Number: 6,009,924

[45] Date of Patent: Jan. 4, 2000

[54] APPARATUS FOR THE THERMAL BINDING OF SHEETS

[75] Inventor: Guido Peleman, Puurs, Belgium

[73] Assignee: Unibind (Cyprus) Limited, Cyprus

[21] Appl. No.: 08/947,632

[22] Filed: Oct. 9, 1997

[30] Foreign Application Priority Data

Oct. 11, 1996 [BE] Belgium ................................ 9600861

[51] Int. Cl.$^{7}$ ............................ B32B 31/00; H01H 9/00; H01H 47/18; B42C 9/00

[52] U.S. Cl. ............... 156/350; 156/272.2; 200/61.45 R; 200/61.52; 361/164; 361/170; 361/180; 412/8; 412/11; 412/900; 412/902

[58] Field of Search ................................ 412/8, 11, 900, 412/902; 156/250, 359, 477.1, 272.2, 273.7, 275.3, 580, 350, 357, 358, 363; 361/160, 161, 164, 170, 180; 200/61.45 M, 61.45 R, 61.53

[56] References Cited

U.S. PATENT DOCUMENTS

| | | | |
|---|---|---|---|
| 3,562,603 | 2/1971 | Smith | 317/157 |
| 4,108,713 | 8/1978 | Weisz . | |
| 4,271,763 | 6/1981 | Berger | 104/179 |
| 4,678,386 | 7/1987 | Wiholm . | |
| 5,213,462 | 5/1993 | Loibl | 412/33 |
| 5,219,453 | 6/1993 | Furukawa et al. | 412/33 |
| 5,246,325 | 9/1993 | Morishige et al. . | |

*Primary Examiner*—Richard Crispino
*Assistant Examiner*—J. A. Lorengo
*Attorney, Agent, or Firm*—Bacon & Thomas PLLC

[57] ABSTRACT

An apparatus for the thermal binding of sheets includes at least one support (5–5*a*–5B) for a binding element (3). The binding element has a binding back on which an amount of glue (4), which melts under the influence of heat, is provided. A heating element (6) co-operating with the support (5-5A-5B) or forming part thereof, a detection device (7) to detect the presence of the binding element (3) in the apparatus (1) and a control/switching device (8), which is connected to the detection device (7) and is connected to the heating element (6) in order to switch it on and/or off, are also included. The detection device (7) is applied underneath the support (5–5A–5B).

10 Claims, 2 Drawing Sheets

1
3
5
5A
5B
6
7
8
IV
V
15
16
17
18
19
20

APPARATUS FOR THE THERMAL BINDING OF SHEETS

BACKGROUND OF THE INVENTION

1. Field of the Invention

The present invention relates to an apparatus for the thermal binding of sheets, more specifically for the binding of sheets by a binding element having a binding back on which an amount of glue, which melts under the influence of heat, is provided.

2. Description of the Related Art

It is known that such apparatus mainly consist of a support on which a binding element with a binding back may be placed and a heating element co-operating with the support or forming part thereof. When the heating element is turned on, the binding back heats up, the glue melts and the sheets to be bound are penetrated by the glue.

It is also known to equip these apparatus with detection means to detect the presence of a binding element in the apparatus and with control/switching means which, on the one hand, is connected to the detection means and, on the other hand, is connected to the heating element to switch it on and/or off in such a way that the binding cycle takes place more or less automatically.

In the known embodiments, these detection means consist of an optical eye which is applied sideways above said support in such a way that the presence of a binding element on the support may be detected.

These known embodiments, however, have several disadvantages.

A first disadvantage is that normal operation may be disturbed by dirt, such as dust, material remainders and such like which end up in the apparatus in front of the optical eye.

A second disadvantage is that the presence of the optical eye disadvantageously influences the width of the device. In the case of a plural apparatus, in other words one with several supports applied one next to the other, the possibility of using such an optical eye, and thus the possibility of automating the apparatus, is nearly excluded.

SUMMARY OF THE INVENTION

The invention aims at an apparatus which does not present the above-mentioned disadvantages.

To this end, the invention is an apparatus for the thermal binding of sheets comprising at least one support for a binding element. The binding element has a binding back on which an amount of glue, which melts under the influence of heat, is provided. A heating element co-operating with the support or forming part thereof, a detection device arranged to detect the presence of the binding element in the apparatus, and a control/switching device, which is connected to the detection device and is connected to the heating element to switch it on and/or off, are also included. The detection device is applied underneath the support.

Because the detection device is applied underneath the support, normal operation thereof cannot be disturbed and the width of the apparatus is not adversely influenced.

Preferably, the detection device is not located directly underneath the support, but under the heating element co-operating with the support. The advantage is that the detection device does not influence the heat transfer from the heating element to the support.

In cases where the apparatus is intended to be used for binding by binding elements which have a binding back with a magnetic metal profile, more specifically steel, the detection device preferably comprises a magnetically sensitive device which reacts to the presence of the metal profile in the apparatus.

According to an other embodiment, which can be used for all kinds of binding elements using fusible glue, the detection device according to the invention comprises a movement device arranged to allow the support to move when applying a binding element, preferably due to its weight, and a movement detection device which can detect movement of the support. The movement detection device may be a switch, a push-button, a sensor or the like.

BRIEF DESCRIPTION OF THE DRAWINGS

In order to better show the characteristics according to the invention, some preferred embodiments are described hereafter as examples without any limitative character whatsoever, reference being made to the accompanying drawings in which.

DETAILED DESCRIPTION OF THE PREFERRED EMBODIMENTS

Figure 1:
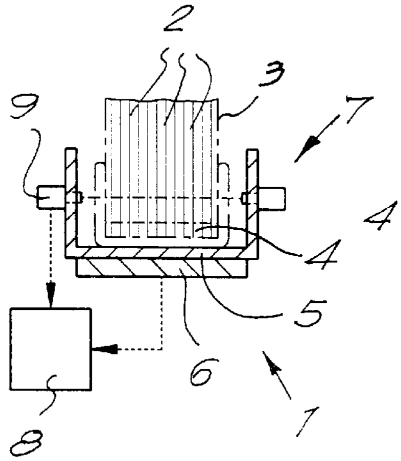
FIG. 1 schematically represents a cross-section of a known apparatus.

In FIG. 1 a known apparatus 1 for binding sheets 2 in a binding element 3 is represented. Binding element 3 is provided with an amount of glue 4 which melts under the influence of heat.

Apparatus 1 hereby consists of a support 5 for binding element 3, a heating element 6 co-operating with support 5, a detection device 7 to detect the presence of binding element 3 in apparatus 1 and a control/switching device 8 which, on the one hand, is connected to detection device 7 and, on the other hand, is connected to heating element 6 to switch it on and/or off. Detection device 7 hereby consist of an optical eye 9 which, because it necessarily has to be applied sideways next to support 5, results in the disadvantages mentioned previously.

Figure 2:
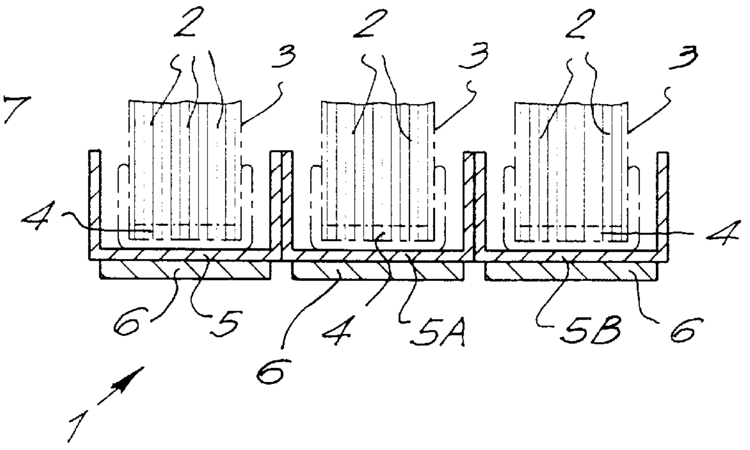
FIG. 2 represents a variant of FIG. 1.

In the case where several supports 5–5A–5B are provided one next to the other, as represented in FIG. 2, the possibility of using optical eye 9 is practically excluded.

As represented in FIGS. 3 to 6, this is remedied according to the invention by applying detection device 7 underneath supports 5–5A–5B.

Figure 5:
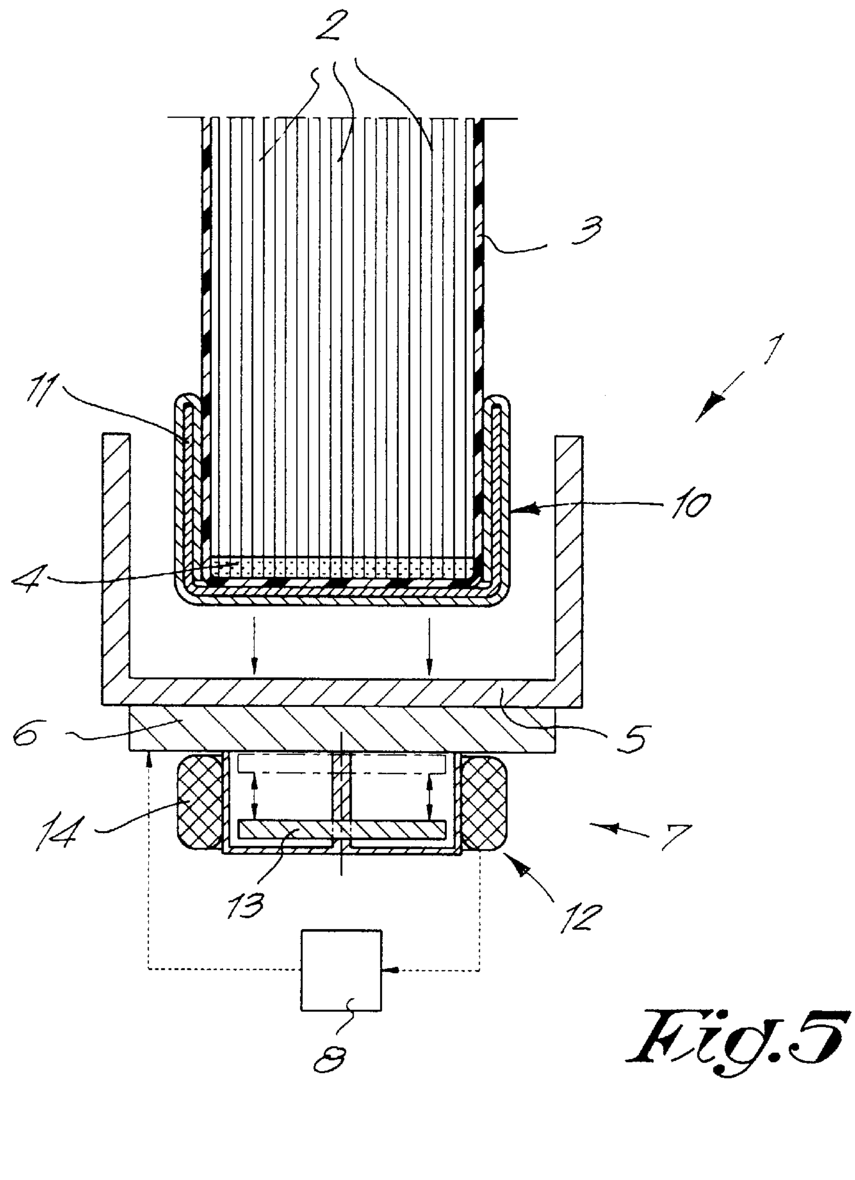
FIG. 5 represents, at an enlarged scale and for a practical embodiment, a section according to line V—V in FIG. 4.

In FIG. 5, a practical embodiment is represented more in detail, which is intended to be used for binding sheets 2 by binding element 3 having a binding back 10 with a magnetic metal, more specifically steel, profile 11. Detection device 7 consist of a magnetically sensitive device 12 which reacts to the presence of metal profile 11 in apparatus 1.

As schematically represented, magnetically sensitive device 12 comprises a movable magnetic element 13, which is movable vertically, and a motion detection element 14, such as a solenoid, which detects motion of magnetic element 13. Operation relies on the fact that magnetic element 13 is attracted by profile 11 at the moment binding element 3 is placed on support 5. This results in an electrical signal in motion detection element 14 such that the desired control of heating element 6 is provided through control/switching device 8.

It is clear that according to a variant, other detection devices 7 which rely on magnetism, such as a read relay for detecting motion of element 13, may be used. An element which creates a magnetic field may be used also. Changes in the magnetic field due to penetration of profile 11 may be electronically determined.

Figures 3, 4, 6:
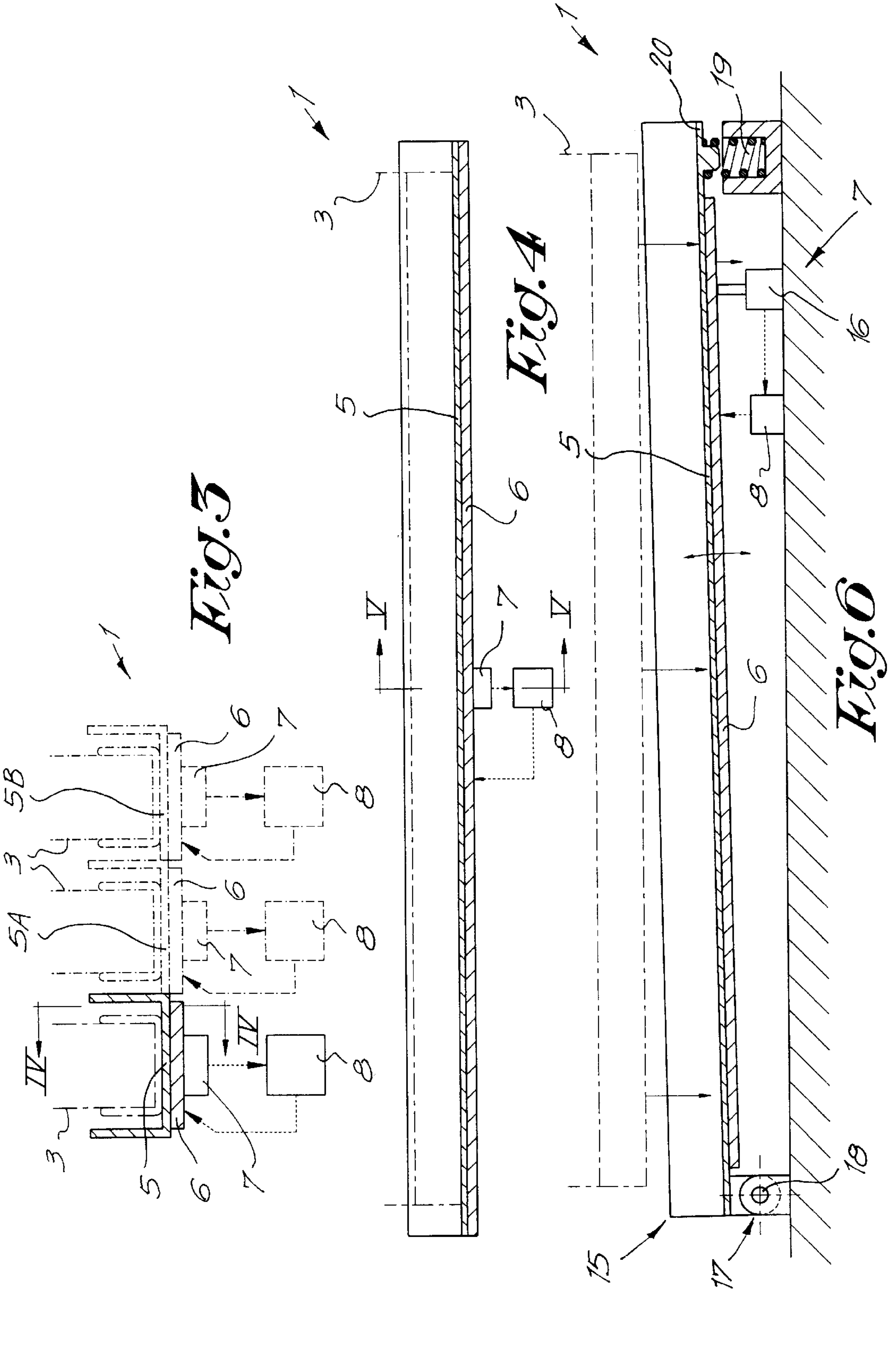
FIG. 3 schematically represents a cross-section of an apparatus according to the invention.
FIG. 4 schematically represents a section according to line IV—IV in FIG. 3.
FIG. 6 represents a view similar to that of FIG. 4, but for an alternative embodiment.

In FIG. 6, an embodiment of the invention is represented whereby detection device 7 comprises a movement device 15 which allows support 5 to move when applying binding element 3, in this case due to the weight of binding element 3 and sheets 2, and a movement detection device 16 which detects movement of support 5 and thus delivers a signal to control/switching device 8.

In the represented example, movement device 15 comprises a springy hinged suspension 17 of support 5. Suspension 17 is formed by a hinge connection 18 and a spring support 19 such the application of that binding element 3 with sheets 2 on support 5 moves support 5 at an extremity 20.

Movement detection device 16 may comprise a switch element such as a push-button, a switch or a sensor which reacts to movement of support 5 at extremity 20.

Operation of this embodiment relies on support 5 rotating around hinge connection 18 under the weight of binding element 3 and sheets 2 and movement detection device 16 detecting this movement so that control/switching device 8 is signaled.

Operation of control/switching device 8 may be of a various nature. Control/switching device 8 may comprise an electric and/or electronic circuit or switching system which turns heating element 6 on as long as detection device 7 detects the presence of binding element 3 on support 5. According to a variant, control/switching device 8 may also be equipped with a time circuit which provides that heating element 6 is turned on after the application of binding element 3 on support 5 and provides that heating element 6 is automatically turned off after a certain time.

It is clear that control/switching device 8 may also be connected to a display or pilot lights which inform the user of apparatus 1 whether or not heating element 6 is turned on.

In the simplest embodiment, detection device 7 and control/switching device 8 are integrated into a whole. In such case, they may comprise a push-button which closes an electric circuit of heating element 6 when it is pressed.

As represented in FIG. 3, apparatus 1 may comprise several supports 5–5A–5B located one next to the other for the simultaneous treatment of several binding elements. Each support 5–5A–5B is provided with a separate heating element 6, a separate detection device 7 and a separate control/switching device 8.

The present invention is in no way limited to the embodiments described above and represented in the drawings, but such a device for the thermal binding of sheets may be realized in different forms and dimensions without leaving the scope of the invention.

I claim:

1. An apparatus for the thermal binding of sheets by at least one binding element having a binding back which is provided with an amount of glue that melts under the influence of heat, comprising:

at least one support for supporting a binding element on one side of said support;

a heating element arranged to cooperate with said support;

a detection device arranged to detect the presence of said binding element in said apparatus, said detection device being positioned on the opposite side of and substantially underneath said support; and a control/switching device arranged to control/switch said heating element, said control/switching device connected to said detection device and said heating element.

2. An apparatus according to claim 1, comprising: a plurality of supports immediately next to one another arranged to simultaneously treat a plurality of binding elements.

3. An apparatus according to claim 1, wherein said detection device is positioned underneath said heating element.

4. An apparatus according to claim 1, wherein said detection device comprises: a movement device arranged to allow said support to move when said binding element is applied; and a movement detection device arranged to detect movement of said support.

5. An apparatus according to claim 4, wherein said movement device comprises a hinged suspension of said support and said movement detection device comprises a switch element which cooperates with said support.

6. An apparatus according to claim 1, comprising: a plurality of supports next to one another arranged to simultaneously treat a plurality of binding elements, wherein each support is provided with a separate heating element, a separate detection device and a separate control/switching device.

7. An apparatus according to claim 6, wherein each of said separate detection devices is positioned underneath a different one of said separate heating elements.

8. An apparatus for the thermal binding of sheets by at least one binding element having a binding back which has a magnetic metal profile and which is provided with an amount of glue that melts under the influence of heat, comprising:

at least one support for supporting a binding element;

a heating element arranged to cooperate with said support;

a detection device positioned underneath said support and arranged to detect the presence of said binding element in said apparatus, said detection device comprising a magnetically sensitive device which reacts to the presence of a magnetic metal profile of said binding element; and a control/switching device arranged to control/switch said heating element, said control/switching device connected to said detection device and said heating element.

9. An apparatus according to claim 8, wherein said magnetically sensitive device comprises: a movable magnetic element; and a motion detection element arranged to detect motion of said magnetic element.

10. An apparatus according to claim 9, wherein said motion detection element detects a change in a magnetic field caused by motion of said magnetic element.

* * * * *